(12) United States Patent
Todd et al.

(10) Patent No.: US 7,021,383 B2
(45) Date of Patent: Apr. 4, 2006

(54) SUBTERRANEAN TREATMENT FLUIDS AND METHODS OF USING THESE FLUIDS TO STIMULATE SUBTERRANEAN FORMATIONS

(75) Inventors: Bradley L. Todd, Duncan, OK (US); Eric Davudson, Aberdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 253 days.

(21) Appl. No.: 10/643,686

(22) Filed: Aug. 19, 2003

(65) Prior Publication Data

US 2004/0163814 A1   Aug. 26, 2004

Related U.S. Application Data

(63) Continuation-in-part of application No. 10/348,458, filed on Jan. 21, 2003, now Pat. No. 6,877,563.

(51) Int. Cl.
    *E21B 43/27*   (2006.01)

(52) U.S. Cl. ............. 166/307; 166/300; 166/308.2

(58) Field of Classification Search ............. 166/263, 166/270, 271, 282, 283, 300, 307, 308.2; 507/103, 267, 268
    See application file for complete search history.

(56) References Cited

U.S. PATENT DOCUMENTS

| | | | | |
|---|---|---|---|---|
| 3,868,998 | A | * 3/1975 | Lybarger et al. | ............ 166/278 |
| 3,960,736 | A | 6/1976 | Free et al. | ............ 252/8.55 |
| 4,026,361 | A | 5/1977 | Knapp et al. | ............ 166/281 |
| 4,136,739 | A | 1/1979 | Salathiel et al. | ............ 166/300 |
| 4,143,007 | A | 3/1979 | DeMartino et al. | ......... 260/17.4 |
| 4,151,879 | A | 5/1979 | Thomas | ............ 166/307 |
| 4,169,798 | A | 10/1979 | DeMartino | ............ 252/8.55 |
| 4,247,402 | A | 1/1981 | Hartfiel | ............ 252/8.5 |
| 4,368,136 | A | 1/1983 | Murphey | ............ 252/316 |
| 4,536,297 | A | 8/1985 | Loftin et al. | ............ 252/8.5 |
| 4,807,703 | A | * 2/1989 | Jennings, Jr. | ............ 166/307 |
| 4,986,355 | A | * 1/1991 | Casad et al. | ............ 166/295 |
| 5,126,051 | A | 6/1992 | Shell et al. | ............ 210/632 |
| 5,165,477 | A | 11/1992 | Shell et al. | ............ 166/291 |
| 5,223,159 | A | 6/1993 | Smith et al. | ............ 252/8.551 |
| 5,224,546 | A | 7/1993 | Smith et al. | ............ 166/300 |
| 5,678,632 | A | 10/1997 | Moses et al. | ............ 166/307 |
| 5,813,466 | A | 9/1998 | Harris et al. | ............ 166/300 |
| 6,196,320 | B1 | 3/2001 | Ray et al. | ............ 166/312 |
| 6,422,325 | B1 | 7/2002 | Krieger | ............ 175/50 |
| 6,432,885 | B1 | 8/2002 | Vollmer | ............ 507/236 |
| 6,509,301 | B1 | 1/2003 | Vollmer | ............ 507/236 |
| 2004/0152601 | A1 | 8/2004 | Still et al. | ............ 507/100 |

OTHER PUBLICATIONS

Cantu, et al, "Laboratory and Field Evaluation of a Combined Fluid-Loss-Control Additive and Gel Breaker for Fracturing Fluids," SPE Paper 18211 (1990).

SPE 68911 "Stimulation of a Producing Horizontal Well Using Enzymes that Generate Acid In-Situ—Case History" by Ralph E. Harris, et al., dated May 21, 2001.

Arcasolve Technical Document—MD1"Arcasolve High Performance Drilling Damage Removal"; Rev. 1, dated Oct. 1998.

* cited by examiner

*Primary Examiner*—Zakiya W. Bates
(74) *Attorney, Agent, or Firm*—Robert A. Kent; Crutsinger & Booth

(57) ABSTRACT

The present invention provides fluid compositions comprising water and a formate ester, and methods of using these fluids in subterranean formations. Optionally, other additives may be added.

21 Claims, No Drawings

SUBTERRANEAN TREATMENT FLUIDS AND METHODS OF USING THESE FLUIDS TO STIMULATE SUBTERRANEAN FORMATIONS

CROSS-REFERENCE TO RELATED APPLICATIONS

This Application is a Continuation-In-Part of U.S. application Ser. No. 10/348,458 filed on Jan. 21, 2003, now U.S. Pat. No. 6,877,563.

BACKGROUND OF THE INVENTION

1. Field of the Invention

The present invention relates to subterranean treatment operations, and more particularly, to treatment fluids comprising water and a formate ester, and methods of using these treatment fluids in subterranean formations.

2. Background of the Invention Technology

The production of fluids (e.g., oil and gas) from subterranean formations may often be enhanced by stimulating a region of the formation surrounding a well bore. Where the subterranean formation comprises an acid-soluble component such as calcium carbonate (e.g., limestone), or calcium magnesium carbonate (e.g., dolomite), for example, stimulation is often achieved by contacting the formation with a treatment fluid comprising an acid source, a procedure often referred to as "acidizing" the formation. For example, where formic acid contacts and reacts with a formation comprising calcium carbonate, the calcium carbonate is consumed to produce water and calcium formate, a salt. After the acidization is completed, the water and salts dissolved therein may be recovered by producing them to the surface, e.g., "flowing back" the well, thereby leaving a desirable amount of voids within the formation, which enhances the formation's permeability and increases the rate at which hydrocarbons may subsequently be produced from the formation.

One method of acidizing, known as "fracture acidizing," comprises injecting such treatment fluid into the formation at a pressure sufficient to create or extend a fracture within the subterranean formation. Once the fracture has been created or extended, the presence of the acid source may "etch" the surface of the formation along the length of the fracture, e.g., the acid source reacts with and consumes a portion of the formation, thereby "etching" channels into the formation. When the fracture closes at the completion of the treatment, a desirable amount of channels remain within the formation, thereby enhancing the permeability of the formation by providing large pathways for hydrocarbons to flow from the formation to the well bore, whereupon the hydrocarbons may be produced to the surface and recovered. Another method of acidizing, known as "matrix acidizing," comprises injecting the treatment fluid into the formation at a pressure below that which would create or extend a fracture within the subterranean formation. Accordingly, in matrix acidizing, the acid source within the treatment fluid is permitted to contact and react with the matrix of the subterranean formation so as to enhance its permeability, but the formation is not fractured.

Acidizing treatments such as those described above may be problematic, however, because the introduction of an acid to a subterranean formation comprising an acid-soluble component (for example, calcium carbonate) generally results in consumption of the acid near the well bore, rather than deeper penetration into the pores or fractures of the subterranean formation. Where this occurs, it is generally thought to be undesirable in that it may fail to achieve a main goal of acidizing, which is the creation of high conductivity channels extending from the well bore as far into the subterranean formation as needed to achieve the desired degree of stimulation or damage removal. In such circumstances, the operator may often modify the acid source in such a way as to facilitate such contact. For example, an operator may increase the viscosity of the acid before introducing it into the subterranean formation, e.g., by using a treatment fluid comprising a gelled or emulsified form of the acid. The use of a gelled or emulsified acid may be expensive, due to the high cost of viscosifiers which are also resistant to acid exposure. Additionally, the use of a gelled or emulsified acid may be problematic because of the difficulty in removing any residual acid which may undesirably remain in the subterranean formation after application of the gelled or emulsified acid therein. Or, an operator may elect to use a weak acid in conjunction with a conjugate base, wherein the pH of the acid is increased, which may delay the rate at which the acid reacts with the formation until such point as the acid has penetrated further into the formation. This may also be problematic, because such a fluid will have less acid capacity for a given fluid volume.

Another approach has involved the use of a treatment fluid comprising an aqueous solution of an ester of acetic acid (for example, glycerol triacetate) and a lipase-type enzyme, which enzyme may facilitate cleaving the ester and releasing acetic acid so as to acidize the subterranean formation. However, the use of such treatment fluids may be problematic for reasons such as the price of the enzyme, and the cost and difficulty in providing storage for the enzyme (particularly in tropical and desert locations). Further, the use of such treatment fluids may be limited to applications in subterranean formations having a temperature at about or below 212° F. Also, the presence in such treatment fluids of certain commonly-used additives may risk denaturing the enzyme. Additionally, acetic acid is a relatively weak acid, which may adversely affect the efficiency of some applications of treatment fluids comprising a source of acetic acid. For example, an experiment wherein a source of calcium carbonate was contacted with glycerol diacetate showed that after nine days, only about 20% of the theoretically available acetic acid had reacted with the calcium carbonate.

SUMMARY OF THE INVENTION

The present invention relates to subterranean treatment operations, and more particularly, to treatment fluids comprising water and a formate ester, and methods of using these treatment fluids in subterranean formations.

An example of a method of the present invention is a method of stimulating a subterranean formation, comprising the steps of: placing a fluid comprising water and a formate ester in the formation; and permitting the fluid to react with the formation such that the permeability of a region of the formation is increased.

An example of a composition of the present invention is a fluid comprising water and a formate ester.

The features and advantages of the present invention will be readily apparent to those skilled in the art upon a reading of the description of the preferred embodiments which follows.

DETAILED DESCRIPTION OF EXEMPLARY EMBODIMENTS

The present invention relates to subterranean treatment operations, and more particularly, to treatment fluids comprising water and a formate ester, and methods of using these treatment fluids in subterranean formations. While the compositions and methods of the present invention are useful in a variety of subterranean applications, they may be particularly useful in stimulation operations, e.g., matrix acidizing and fracture acidizing.

The treatment fluids of the present invention generally comprise water and a formate ester. Optionally, other additives suitable for use in subterranean treatment operations may be added.

The water utilized in the treatment fluids of the present invention may be fresh water, salt water (e.g., water containing one or more salts dissolved therein, in either saturated or unsaturated form), brine, formation water, or seawater. In certain exemplary embodiments of the present invention, fresh water is utilized.

A wide variety of formate esters may be used in the treatment fluids of the present invention. Examples of suitable formate esters include, but are not limited to, monoethylene glycol monoformate, monoethylene glycol diformate, diethylene glycol diformate, glyceryl monoformate, glyceryl diformate, glyceryl triformate, triethylene glycol diformate and formate esters of pentaerythritol. In certain exemplary embodiments, the formate ester is ethylene glycol monoformate; in other exemplary embodiments, the formate ester is diethylene glycol diformate. In certain exemplary embodiments of the present invention, the formate ester may have low solubility in water, such as monoethylene glycol diformate, for example. Where such low solubility formate esters are used, they may also aid in providing temporary control of fluid loss to the formation, or by serving as a diverting agent, e.g., a component within a treatment fluid whose presence ensures uniform injection over the region of the subterranean formation to be treated. The use of low solubility formate esters may impart such benefits because, inter alia, a bulk fluid comprising two relatively immiscible components may flow through a subterranean formation less readily than a single phase fluid, and may be particularly useful in treating zones of variable permeability.

Generally, the formate ester may be present in the treatment fluids of the present invention in an amount sufficient to achieve a desired degree of stimulation of the subterranean formation. More particularly, the formate ester utilized may be present in the treatment fluid in an amount in the range of from about 5% to about 65% by weight of water therein. The amount of formate ester suitable for a particular application may depend on factors including, but not limited to, the amount of subterranean formation desired to be dissolved, the particular ester used, the concentration of salts in the water used, and the formation temperature. For example, in certain exemplary embodiments of the invention, an increased possibility of precipitation of calcium formate at ambient temperature may arise where the formate ester is present in the treatment fluid at concentrations of about or above 17% by weight of the water therein. Accordingly, certain exemplary embodiments of the treatment fluids of the present invention comprise a formate ester in the range of from about 10% to about 16% by weight of water therein; such exemplary embodiments may be particularly suitable for applications having a formation temperature of about 70° F. to about 80° F. . One of ordinary skill in the art, with the benefit of this disclosure, will be able to determine the proper amount of formate ester to include in the treatment fluid for a particular application.

When used in accordance with the present invention, the formate ester will generally react with the water present in the treatment fluids of the present invention, and hydrolyze to produce an acid. While the rate at which this reaction occurs depends on factors including, but not limited to, temperature, the reaction generally does not occur to a significant extent until a desired time after the treatment fluid has been placed in the subterranean formation. The unhydrolyzed formate ester has essentially a neutral pH which may permit it to be injected into the formation without reacting prematurely. Accordingly, the treatment fluids of the present invention may penetrate a region of the subterranean formation surrounding the well bore to a desired depth before the acid is produced by hydrolysis of the formate ester. This delayed release of acid may permit the acid to be released deeper into the formation, thereby permitting the acid to create channels of enhanced permeability extending as far into the subterranean formation as needed to achieve the desired degree of stimulation or damage removal. In certain exemplary embodiments of the present invention, the treatment fluid may be placed within the subterranean formation by being injected into the formation at a pressure sufficient to create or extend a fracture within the formation.

Optionally, the treatment fluids of the present invention may further comprise a fluid loss control additive. A wide variety of known fluid loss control additives may be used with the treatment fluids of the present invention. For example, aliphatic polyesters, lactide, poly(lactide), particulate poly(lactic acid), and copolymers thereof, may be used as a fluid loss control additive. One of ordinary skill in the art, with the benefit of this disclosure, will recognize the appropriate fluid loss control additive for a particular application. Where used, the fluid loss control additive is generally present in the treatment fluid in an amount in the range of from about 0.1% to about 5% by weight of the treatment fluid.

Additional additives may be added to the compositions of the present invention as deemed appropriate by one skilled in the art with the benefit of this disclosure. Examples of such additives include, inter alia, de-emulsifiers, anti-sludging agents, corrosion inhibitors, iron control agents, and the like.

Where the treatment fluids of the present invention are used in acidization operations, an operator may place a treatment fluid of the present invention within the subterranean formation, and permit it to react therein for a desired amount of time, after which the well may be placed on production in order to flow back the dissolved salts, e.g., calcium formate, and the like. An operator may determine the appropriate amount of residence time within the subterranean formation by a variety of methods. For example, the operator may contact a sample of the treatment fluid with powdered calcium carbonate, and follow the kinetics of the reaction at the temperature of interest, and incorporate information learned thereby into the determination of the appropriate residence time. One of ordinary skill in the art, with the benefit of this disclosure, will be able to determine the appropriate residence time for a particular application.

In certain exemplary embodiments of the present invention, an operator may elect to precede (or follow) the injection of a treatment fluid of the present invention into the subterranean formation with the separate, prior (or subsequent) injection therein of an acid. For example, such separate injection of an acid may be performed so as to achieve a desired amount of etching of the regions of the formation in close proximity to the well bore. In deciding whether to perform the step of separately injecting an acid into the formation before injecting a treatment fluid of the present invention into the formation, relevant considerations may include, inter alia, the degree of near-well-bore etching that is desired, the bottom hole temperature of the well bore, and the rate at which the particular formate ester present in the treatment fluid will hydrolyze to produce an acid at the particular bottom hole temperature. In certain exemplary embodiments of the present invention where an acid is separately injected into the formation, acids such as hydrochloric acid, acetic acid, or the like may be used. The amount of near-well-bore etching that is desirable will vary depending on the particular formation. One of ordinary skill in the art with the benefit of this disclosure will recognize the extent to which near-well-bore etching is desirable, as well as the quantity of acid necessary to achieve the desired near-well-bore etching for a particular application.

An example of a composition of the present invention comprises water and 10% diethylene glycol diformate by weight of the water.

An example of a method of the present invention is a method of stimulating a subterranean formation comprising the step of placing a fluid comprising water and a formate ester in the formation, and permitting the fluid to react with the formation such that the permeability of a region of the formation is increased. Additional steps may comprise, inter alia, the step of placing an acid in the formation; and the step of producing a fluid (e.g., oil, gas) from the formation.

To facilitate a better understanding of the present invention, the following examples of some of the preferred embodiments are given. In no way should such examples be read to limit the scope of the invention.

EXAMPLE 1

A core sample was provided comprising limestone from a gas storage reservoir in Germany. A solution comprising 1% potassium chloride brine was flowed through the core sample for a time sufficient to measure and record the initial permeability of the core sample in both the "production direction," e.g., the direction in which hydrocarbons produced from the formation flow, and in the "injection direction," e.g., the direction in which fluid would be injected into the formation. The average initial permeability of the core sample in the production direction was determined to be 94 mD, and the initial permeability in the injection direction was determined to be 67 mD.

The core sample was then contacted with a xanthan/starch/calcium carbonate drill-in fluid for two hours at 163° F., with a 1000 psi differential pressure applied in the injection direction, to establish a filter cake on the inner surface of the core sample. Next, the core sample was contacted with a solution of 1% potassium chloride brine, to displace the drill-in fluid. The 1% potassium chloride brine solution was flowed through the core sample in the production direction, in an attempt to flow the filter cake away from the surface of the core. During this time, the average permeability of the core sample in the production direction was measured to be 41 mD. An unsuccessful attempt was made to circulate the 1% potassium chloride brine through the core sample in the injection direction, but no flow was possible; the permeability of the core sample in the injection direction was effectively zero. The results of the testing are summarized in Table 1 below:

TABLE 1

| Core Sample | Initial Permeability (Production Direction) | Initial Permeability (Injection Direction) | Final Permeability (Production Direction) | Final Permeability (Injection Direction) |
|---|---|---|---|---|
| Sample 1 | 94 mD | 67 mD | 41 mD | <1 mD |

The above example demonstrates, inter alia, that the permeability of the core sample could not be improved merely by attempting to flush out obstructions therein.

EXAMPLE 2

A core sample was provided comprising limestone from a gas storage reservoir in Germany. A solution comprising 1% potassium chloride brine was flowed through the core sample for a time sufficient to measure and record the initial permeability of the core sample in both the production direction and in the injection direction. The average initial permeability of the core sample in the production direction was determined to be 159 mD, and the initial permeability in the injection direction was determined to be 163 mD.

The core sample was then contacted with a xanthan/starch/calcium carbonate drill-in fluid for two hours at 163° F., with a 1000 psi differential pressure applied in the injection direction, to establish a filter cake on the inner surface of the core sample. Next, the core sample was contacted with a solution of 1% potassium chloride brine to displace the drill-in fluid. The core sample was then contacted with a treatment fluid of the present invention comprising water, 10% diethylene glycol diformate by volume, and 0.2% starch enzyme breaker for about 16 hours. Subsequently, a 1% potassium chloride brine was circulated through the core sample in the injection direction, during which time the average permeability of the core sample in the injection direction was measured to be 143 mD. The 1% potassium chloride brine was circulated through the core sample in the production direction, during which time the average permeability of the core sample in the production direction was measured to be 573 mD. The results of the testing are summarized in Table 2 below:

TABLE 2

| Core Sample | Initial Permeability (Production Direction) | Initial Permeability (Injection Direction) | Final Permeability (Production Direction) | Final Permeability (Injection Direction) |
|---|---|---|---|---|
| Sample 2 | 159 mD | 163 mD | 573 mD | 143 mD |

The decrease of about 13% in the average permeability of the core sample in the injection direction is believed to be attributable to the presence of unreacted calcium carbonate remaining on the face of the core sample so as to inhibit flow. The permeability of the core sample in the injection direction was observed to increase by about 300% after being contacted with a treatment fluid of the present invention. The above example demonstrates, inter alia, that the treatment fluids of the present invention may enhance the permeability of the subterranean formation.

EXAMPLE 3

A core sample was provided comprising limestone from a gas storage reservoir in Germany. A solution comprising 1% potassium chloride brine was flowed through the core sample for a time sufficient to determine and record the initial permeability of the core sample in both the production direction and injection direction. The average initial permeability of the core sample in the production direction was determined to be 93 mD, and the average initial permeability in the injection direction was determined to be 81 MD.

The core sample was then contacted with a xanthan/starch/calcium carbonate drill-in fluid for two hours at 163° F., with a 1000 psi differential pressure applied in the injection direction, to establish a filter cake on the inner surface of the core sample. Next, the core sample was contacted with a solution of 1% potassium chloride brine to displace the drill-in fluid. The core sample was then contacted with a treatment fluid of the present invention comprising water, 10% diethylene glycol diformate by volume, and 0.2% starch enzyme breaker for about 16 hours. Subsequently, a 1% potassium chloride brine was circulated through the core sample in the production direction, during which time the average permeability of the core sample in the production direction was measured to be 940 mD. The 1% potassium chloride brine was then circulated through the core sample in the injection direction, during which time the average permeability of the core sample in the injection direction was measured to be 1,274 mD. The results of the testing are summarized in Table 3 below:

TABLE 3

| Core Sample | Initial Permeability (Production Direction) | Initial Permeability (Injection Direction) | Final Permeability (Production Direction) | Final Permeability (Injection Direction) |
|---|---|---|---|---|
| Sample 3 | 93 mD | 81 mD | 940 mD | 1,274 mD |

The permeability of the core sample was observed to increase by more than about 1,000% in both the production and injection directions. The above example demonstrates, inter alia, that the treatment fluids of the present invention may enhance the permeability of the subterranean formation.

EXAMPLE 4

When mixed with a brine solution, the treatment fluids of the present invention react with the water in the brine solution to release an organic acid. This reaction generally commences upon mixing of the two liquids. The rate at which the reaction occurs is temperature dependent. A treatment fluid of the present invention comprising water and 10% diethylene glycol diformate by volume was reacted with a 3% sodium chloride brine solution at 86° F. The pH of the resulting mixture was monitored and recorded for a period of time. The results are set forth in Table 4 below:

TABLE 4

| Time (minutes) | pH |
|---|---|
| 15 | 5.7 |
| 30 | 4.8 |
| 45 | 4.4 |
| 60 | 4.2 |
| 75 | 4.1 |
| 90 | 3.9 |
| 105 | 3.8 |
| 150 | 3.7 |
| 190 | 3.5 |

TABLE 4-continued

| Time (minutes) | pH |
|---|---|
| 300 | 3.1 |
| 400 | 2.9 |

The concentration of formic acid at any point in time may be determined by the following relationship:

$$\frac{[\text{Hydrogen\_Ion Concentration}]^2}{(1.698 \times 10^{-4})} = \text{Concentration of Formic Acid} \quad \text{Equation 1}$$

where $1.698 \times 10^{-4}$ represents the dissociation constant for formic acid. Using the above relationship, it is possible to calculate that the concentration of formic acid corresponding to a pH value of 2.9 is 0.0094 gram molecules of formic acid per liter. Therefore, after 400 minutes, the solution in the present example contained 0.0094 gram molecules of free formic acid per liter.

By comparison, a one liter fully hydrolyzed solution of 10% diethylene glyco diformated by volume would contain 1.5 gram molecules of free formic acid. By dividing 0.0094 by 1.5, it may be determined that after 400 minutes, only about 0.6% of the formic acid has been released and would be available for reaction, such as would occur with the surface subterranean formation were the treatment fluid of the present invention placed therein. Accordingly, the example also demonstrates, inter alia, that the majority of the acid is not released until such time as the treatment fluid penetrates further into the pore throats within the subterranean formation.

EXAMPLE 5

A treatment fluid of the present invention comprising water and 10% diethylene glycol diformate by volume was reacted with an aqueous dispersion of calcium carbonate at 167° F. After 24 hours, it was determined, by measuring the remaining amount of soluble calcium, that 86% of the calcium carbonate had been consumed. After an additional 24 hours, it was determined that a total of 90% of the calcium carbonate had been consumed. This example demonstrates, inter alia, that the formate ester present in the treatment fluids of the present invention continues to release formic acid at the test temperature even after 24 hours. Accordingly, the treatment fluids of the present invention may be pumped deep within the formation before reaction will occur, thereby creating the prospect of stimulation of the subterranean formation at considerable distance from the near-well-bore area.

Therefore, the present invention is well-adapted to carry out the objects and attain the ends and advantages mentioned as well as those which are inherent therein. While the invention has been described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The described embodiments of the invention are exemplary only, and are not exhaustive of the scope of the invention.

Consequently, the invention is intended to be limited only by the spirit and scope of the appended claims, giving full cognizance to equivalents in all respects.

What is claimed is:

1. A method of stimulating a subterranean formation, wherein the formation comprises an acid soluble component selected from the group consisting of calcium carbonate and calcium magnesium carbonate, the method comprising the steps of:
    placing a fluid comprising water and a formate ester in the formation;
    determining the appropriate amount of residence time for the formate ester in the fluid to react with the acid soluble component within the subterranean formation; and
    permitting the fluid to react with the formation such that the permeability of a region of the formation is increased.

2. The method of claim 1 wherein the water and the formate ester react to produce an acid.

3. The method of claim 2 wherein the reaction between the water and the formate ester is delayed until the fluid has penetrated into a region of the subterranean formation to a desired extent.

4. The method of claim 3 wherein the formate ester is selected from the group consisting of:
    ethylene glycol monoformate, ethylene glycol diformate, diethylene glycol diformate, glyceryl monoformate, glyceryl diformate, glyceryl triformate, triethylene glycol diformate and formate esters of pentaerythritol.

5. The method of claim 3 further comprising the step of placing an acid in the formation.

6. The method of claim 5 wherein the step of placing the acid in the formation is performed before the step of placing the fluid in the formation.

7. The method of claim 5 wherein the step of placing the acid in the formation is performed after the step of placing the fluid in the formation.

8. The method of claim 6 wherein the acid is selected from the group consisting of hydrochloric acid and acetic acid.

9. The method of claim 3 wherein the step of placing the fluid in the formation comprises injecting the fluid into the formation at a pressure sufficient to create or extend a fracture within the formation.

10. The method of claim 3 further comprising the step of producing a hydrocarbon from the formation.

11. The method of claim 10 wherein the hydrocarbon is selected from the group consisting of oil and gas.

12. The method of claim 3 wherein the formate ester is present in the fluid in an amount in the range of from about 5% to about 65% by weight of the water therein.

13. The method of claim 3 wherein the fluid further comprises a fluid loss control additive, a de-emulsifier, an anti-sludging agent, a corrosion inhibitor, an iron control agent, or a mixture thereof.

14. The method of claim 13 wherein the fluid loss control additive comprises an aliphatic polyester, lactide, poly(lactide), poly(lactic acid), or a copolymer thereof.

15. The method of claim 13 wherein the fluid loss control additive is present in the fluid in an amount in the range of from about 0.1% to about 5% by weight of the fluid.

16. A method of claim 1 wherein the step of determining the appropriate amount of residence time comprises: contacting a sample of the fluid with powdered calcium carbonate and following the kinetics of the reaction.

17. A method of claim 16 wherein the step of contacting a sample of the fluid with powdered calcium carbonate is at the temperature of the subterranean formation.

18. A method of claim 1 wherein the step of determining the appropriate amount of residence time comprises: monitoring the pH of a sample of the fluid.

19. A method of claim 18 wherein the step of determining the appropriate amount of residence time further comprises: using the dissociation constant for formic acid to calculate the concentration of formic acid corresponding to a pH value.

20. A method of claim 1 wherein the formate ester is present in the fluid in the range from about 10% to about 16% by weight of the water therein.

21. A method of claim 20 wherein the step of placing the fluid in the formation further comprises: placing the fluid in a formation having a formation temperature of about 70° F. to about 80° F.

* * * * *